US007109918B1

(12) United States Patent
Meadows et al.

(10) Patent No.: US 7,109,918 B1

(45) Date of Patent: Sep. 19, 2006

(54) NONLINEAR BEAM FORMING AND BEAM SHAPING APERTURE SYSTEM

(75) Inventors: Brian K. Meadows, San Diego, CA (US); Ted H. Heath, Marietta, GA (US); Joseph D. Neff, San Diego, CA (US); Edgar A. Brown, Atlanta, GA (US); David W. Fogliatti, Carlsbad, CA (US); Visarath In, Chula Vista, CA (US); Paul Hasler, Atlanta, GA (US); Steve P. DeWeerth, Marietta, GA (US); William L. Ditto, Gainesville, FL (US); Robert A. York, Goleta, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/446,287

(22) Filed: May 23, 2003

(51) Int. Cl.
*H01Q 3/22* (2006.01)
*G10K 11/34* (2006.01)
*G01S 3/80* (2006.01)
*H01Q 3/00* (2006.01)

(52) U.S. Cl. ........................ 342/368; 342/371; 367/87; 367/99; 367/103; 367/118; 367/119; 367/121

(58) Field of Classification Search ........ 342/367–384, 342/424, 165–175, 195, 52, 59, 73–81; 367/87–106, 367/117–129, 135–138, 140, 141, 153–156
See application file for complete search history.

(56) References Cited

U.S. PATENT DOCUMENTS 3,179,937 A * 4/1965 Abbott ....................... 342/375
3,701,156 A * 10/1972 Killion ....................... 342/424
3,766,558 A * 10/1973 Kuechken .................... 342/375
3,999,182 A * 12/1976 Moeller et al. ............. 342/372
4,065,771 A * 12/1977 Gulick et al. ............... 342/368
4,117,487 A * 9/1978 Minohara et al. ........... 342/372
4,152,702 A * 5/1979 Piesinger .................... 342/367
4,156,877 A * 5/1979 Piesinger .................... 342/368
4,217,586 A * 8/1980 McGuffin ................... 342/380
4,656,642 A * 4/1987 Apostolos et al. .......... 342/368
5,475,392 A * 12/1995 Newberg et al. ............ 342/375
5,479,177 A * 12/1995 Rudish et al. .............. 342/375
5,485,164 A 1/1996 Compton et al.
5,493,306 A * 2/1996 Rudish et al. .............. 342/371

(Continued)

OTHER PUBLICATIONS

Analysis of Interinjection-Locked Oscillators for Integrated Phased Arrays, Karl D. Stephan, 1987.

(Continued)

*Primary Examiner*—Bernarr E. Gregory
(74) *Attorney, Agent, or Firm*—Peter A. Lipovsky; Michael A. Kagan; Allan Y. Lee

(57) ABSTRACT

This invention exploits the synchronization properties of coupled, nonlinear oscillators arrays to perform power combining, beam steering, and beam shaping. This architecture utilizes interactions between nonlinear active elements to generate beam patterns. A nonlinear array integrates the signal processing concurrently with the transduction of the signal. This architecture differs fundamentally from passive transducer arrays in three ways: 1) the unit cells are nonlinear, 2) the array purposely couples the unit cells together, and 3) the signal processing (beam steering and shaping) is done via dynamic interactions between unit cells. The architecture extends to both 1- and 2-dimensional arrays.

10 Claims, 9 Drawing Sheets

U.S. PATENT DOCUMENTS

| | | | | |
|---|---|---|---|---|
| 5,523,764 | A | 6/1996 | Martinez et al. | |
| 5,608,409 | A * | 3/1997 | Rilling | 342/380 |
| 5,977,910 | A * | 11/1999 | Matthews | 342/368 |
| 6,002,365 | A * | 12/1999 | Page | 342/375 |
| 6,473,362 | B1 * | 10/2002 | Gabbay | 367/119 |
| 6,522,294 | B1 | 2/2003 | Vail et al. | |

OTHER PUBLICATIONS

IEEE Transactions on Antennas and Propagation, vol. 36. zNo. 11 Nov. 1988.
Automatic Beam Scanning in Mode-Locked Oscillator Arrays, R.A. York, R.C. Compton, 1992 IEEE.
Phase-Shifterless Beam-Scanning Using Coupled-Oscillators: Theory and Experiment, P. Liao & 1993.
Measurement and Modelling of Radiative Coupling in Oscillator Arrays, R. A. York & R.C. Compton, 1993.
A New Phase-Shifterless Beam-Scanning Technique Using Arrays of Coupled Oscillators. P. Liao & York.
Beam Scanning with Coupled VCOs. P. Liao & R.A. York, 1994.
A 1 Watt X-Band Power Combining Array Using Coupled VCOs. P. Liao & R.A. York, 1994.
A Six-Element Beam-Scanning Array, P. Liao, & York 1994.
A Varactor-Tuned Patch Oscillator for Active Arrays, P. Liao, & R.A. York 1994.
R.A. York & P. Liao, et al. Oscillator Array Dynamics with Broadband N-Port Coupling Networks, 1994.
P.Liao & R.A. York, A High Power Two-Dimensional Coupled-Oscillator Array at X-Band, 1995.
Meadows, Brian K. et al. "Nonlinear Antenna Technology" Proceedings of the IEEE, May 2002, pp. 882-897; vol. 90; No. 5; IEEE Press; USA.
Neff, Joseph D. et al. "A CMOS Coupled Nonlinear Oscillator Array" 2002 IEEE International Symposium on Circuits and Systems; May 26-29, 2002; pp. IV301-IV304; vol. IV; IEEE Press, USA.
R.A. York, Analysis of Beam Scanning & Data Rate Transmission Performance of a Coupled Oscillator Phased Array, Apr. 14-17, 1997, Conference Publication No. 436 IEE 1997.
A. Alexanian, et al. Three-Dimensional FDTD Analysis of Quasi-Optical Arrays Using Floquet Boundary Conditions and Berenger's PML, IEEE Microwave and Guide Wave Ltr, vol. 6. No. 3 Mar. 1996.

* cited by examiner

NONLINEAR BEAM FORMING AND BEAM SHAPING APERTURE SYSTEM

CROSS-REFERENCE TO RELATED APPLICATIONS

This application is related to co-filed application titled: "Method and Apparatus for an Improved Nonlinear Oscillator" by Joseph D. Neff, et al, Navy Case No. 84582 now U.S. patent application Ser. No. 10/446,286 filed 23 May 2003.

INCORPORATION BY REFERENCE

The following document is hereby incorporated by reference: "Nonlinear Antenna Technology", Meadows, Brian K. et al, *Proceedings of the IEEE, Vol.* 90, No. 5, pp. 882–897, 28 May 2002, USA.

BACKGROUND

This invention relates to phased array systems. With greater specificity, but without limitation thereto, the invention relates to phased array systems that employ the intrinsic synchronization properties of nonlinear oscillators. With further specificity, but without limitation thereto, the invention relates to using the intrinsic synchronization properties of nonlinear oscillators in phased array systems to provide simultaneous beam forming and beam shaping to such systems.

Traditionally, passive sensor or radiative arrays have employed linear, independently controlled transducers (also known as "radiators") as the constituent elements of the array. The geometry of these elements controls the radiation of the beam pattern and signal processing gain. Classic phased array aperture (antenna) operation in a receiving mode can be broken into four steps: 1) transduce the received energy; 2) synchronously demodulate the transduced signal; 3) apply weights to phase shift the inputs from each of the transducer elements; and 4) sum the weighted signals together to produce an output signal. The maximum gain possible is proportional to the number of antenna elements. Reciprocity permits the process to be reversed for the transmission of signals.

Implicit in the traditional phased array aperture (antenna) design is that each transducer is either assumed or engineered to be linear and to operate independently of (without an input from) the other transducers in the array. Due to these assumptions, interactions (i.e., "mutual coupling") between array elements are viewed negatively, as such interactions frustrate the formation of a desired antenna pattern. Mitigation of these mutual radiative coupling effects typically requires that transducer spacing be limited to a minimum of half a wavelength of the lowest frequency the array is designed to receive or transmit.

In such arrays, electronic beam steering (or beam scanning) is commonly realized through use of a phase-shifter at each transducer element. A computer typically controls each phase shifter, with control lines to each element being used to program the phase of each individual element. Unfortunately, the phase-shifters add to the weight, power losses, operating power, size, complexity and, significantly, to the cost of the phased array. For certain applications, one or more of these factors will eliminate the viability of using phase-shifters for beam steering an array.

To this end, solutions to phase-shifterless beam steering have been investigated. Several alternatives exist, such as frequency-scanning and multiple beam-forming networks (e.g. Rotman lenses and Butler matrices).

One of the earliest attempts to exploit synchronization for phase-shifterless beam steering was made by Stephan and Morgan (see K. D. Stephan and W. A. Morgan, "Analysis of Inter-Injection-Locked Oscillators for Integrated Phased Arrays", *IEEE Transactions of Antennas and Propagation*, vol. AP-35, pp. 771–781, July 1987). By injecting a sinusoidal signal into the two elements at each end of a 1-dimensional array of intentionally coupled oscillators, Stephan et al showed that the phase distribution across the array will evolve toward a uniform phase gradient. Although experimentally successful, the scan angles are inversely dependent on the number of elements in this interinjection-locking technique. Consequently, the scanning ability of large arrays is very limited.

Professor Robert York of the University of California, Santa Barbara, has suggested an alternative approach. Professor York and his co-workers also utilized an array of nonlinear oscillators. These oscillators were interactively coupled by what is known in the art as "nearest neighbor" coupling. This alternative method does not rely on signal injection (see P. Liao and R. A. York, "A new phase-shifterless beam-scanning technique using arrays of coupled oscillators", *IEEE Transactions of Microwave Theory and Techniques*, vol. 41, pp. 1810–1815, October 1993). Instead, York and company demonstrated both experimentally and analytically that oscillator phase distribution could be manipulated through control of the oscillator natural frequencies. Unlike Stephan's method, York's approach yields phase gradient values between ±90 regardless of the number of oscillators used.

While advances have been made in phase-shifterless beam steering approaches, there is a continued desire to expand the capabilities of such approaches. Besides providing a phase shifterless array system having enhanced scanning capabilities, there is also a desire to provide beam shaping to the attendant beam that is steered, so that simultaneous beam steering and beam shaping (i.e. sidelobe reduction) is possible.

SUMMARY

The invention expands and improves upon phase-shifterless coupled oscillator techniques in the following ways, the invention: 1) Exploits oscillator amplitude and phase dynamics to provide a means for simultaneous beam steering and sidelobe reduction, i.e. beam shaping in addition to beam steering; 2) Provides a means for steering difference patterns as well as sum patterns; and 3) Allows coupling phase to be used as an alternative control parameter for electronic beam steering to thereby produce a greater range of stable phase gradients and greater scan angles.

This invention uses the synchronization property of coupled, nonlinear, oscillator arrays for the generation of amplitude and phase distributions. Because the invention may be implemented in an analog format, the analog format possesses several attractive features over digital implementations: low power consumption, fast adaptation (no digitizing sampling required), modulation and weighting capabilities, and the integration of sensing/energy-transduction and signal processing. The invention eliminates the need for phase shifters, feed networks, and beam-steering computers, making its use particularly desirable for high frequencies applications.

A mathematical description of the array as utilized by the invention, including transduction and transmission elements, is presented. This nonlinear analysis of oscillator phase dynamics describes how to adjust oscillator natural frequencies in order to create a spatially uniform, time-dependent phase gradient across the array. The method also incorporates the use of oscillator amplitude dynamics to provide for aperture weighting and side-lobe reduction.

Because the beam pattern generation and control relies on the intrinsic synchronization properties of nonlinear oscillators, the invention is independent of a specific type of transducer element and is thus suitable for a wide range of applications and frequencies. Specific examples include, but are not limited to, communications, acoustics, remote sensing, radar, and focal plane arrays.

Other objects, advantages and new features of the invention will become apparent from the following detailed description of the invention when considered in conjunction with the accompanied drawings.

DESCRIPTION

Figure 1:
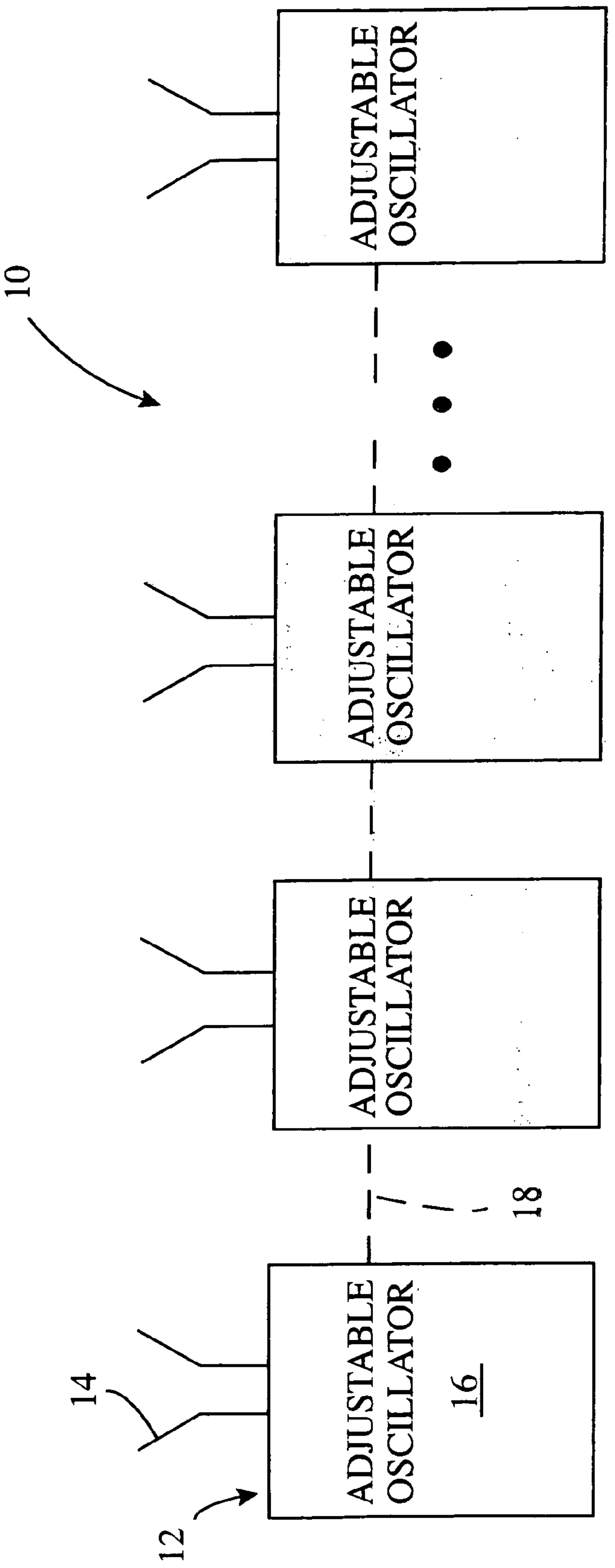
FIG. 1 depicts a transducer-oscillator array system.

Referring to FIG. 1, a transducer-oscillator array 10 is shown. Array 10 includes individual transducer-oscillator pairs 12, each of which include a transducer 14 and an operably coupled non-linear oscillator 16, to be further described. Transducer-oscillator pairs 12 are operably interconnected such as by the representative couplings 18, to be further detailed.

Figure 2:
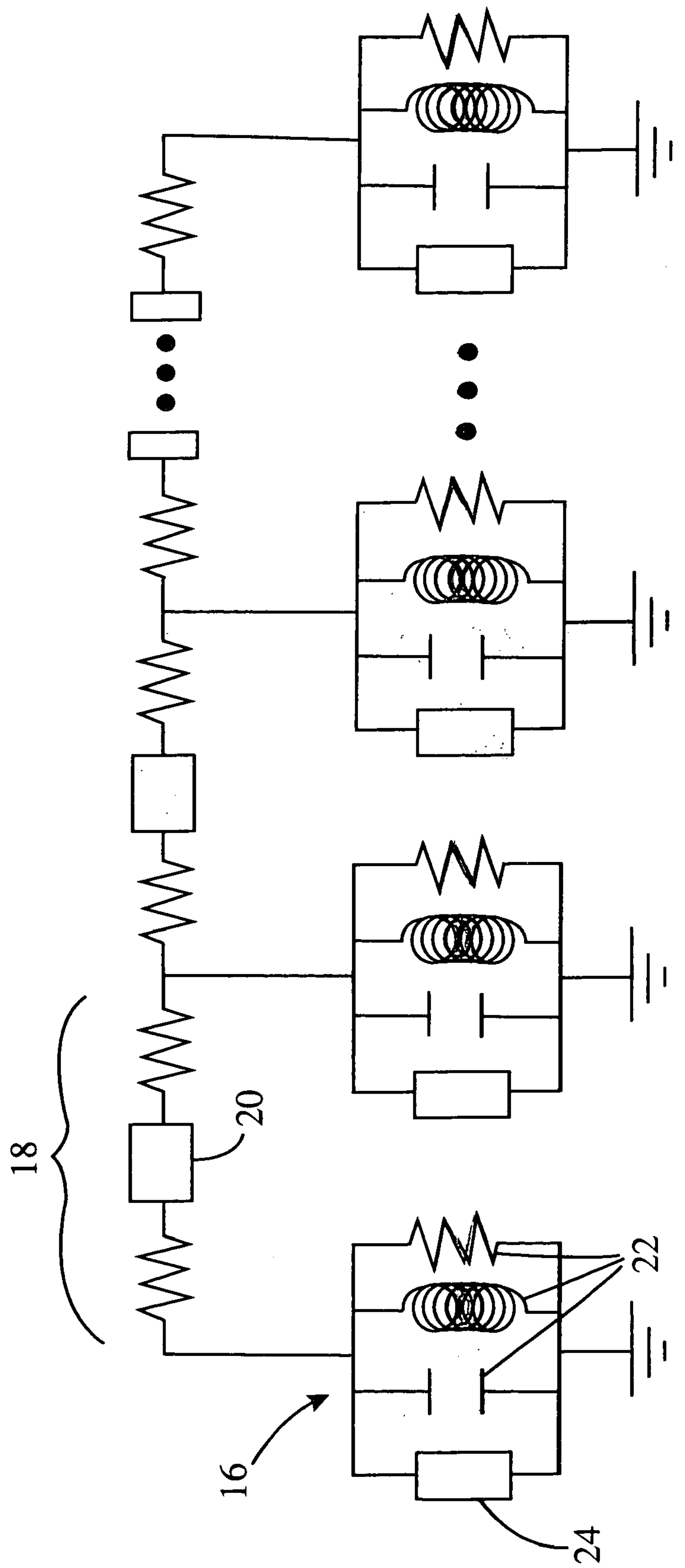
FIG. 2 is a representative oscillator array.

To describe the theory underlying the invention, reference is made to FIG. 2. In FIG. 2, a circuit schematic representation of parameter controlled nonlinear oscillators 16 is illustrated. Shown is a 1-dimensional chain of oscillators 16, each of which is driven or is influenced by a transducer 14 as referenced in FIG. 1 The most significant (dominant) interactions between the oscillators occur between neighboring oscillators, either through direct transmission line coupling 18 or through radiative coupling. Resistively loaded coupling 18 includes an RLC network 20.

The prior art technique of "nearest neighbor" oscillator coupling is assumed for purposes of this analysis, though it should be realized that other prior art coupling techniques are also considered feasible with the invention. Each nonlinear oscillator 16 includes a linear resistor-inductor-capacitor system (RLC) 22 and a nonlinear conductance G, shown as 24 in the figure. Nonlinear conductance G has the form:

$$G=-\alpha+\beta A^2 \qquad \text{(Eq. 1)}$$

where A is the voltage amplitude across the oscillator, and α and β are variables.

This conductance model permits positive and negative resistances, resulting in a self-oscillating circuit whose steady-state amplitude is reached through an energy balance between loss and source terms. Although a parallel RLC combination 22 has been described, a series RLC has been shown to lead to a similar set of dynamical equations.

An assumption in the derivation of the dynamical equations below is that coupling 18 be sufficiently broadband relative to the oscillators, i.e. that the coupling is assumed to be independent of the oscillator frequency. This coupling has a coupling strength factor k of the following form:

$$k_{i,j} = \left\{ \begin{matrix} ke^{i\Phi} & i = j \pm 1 \\ 0 & \text{otherwise} \end{matrix} \right\} \qquad \text{(Eq. 2)}$$

wherein Φ is the phase of the coupling.

By expanding the admittance around an isolated resonance and keeping terms up to and including first derivative terms, the amplitude and phase dynamics of the oscillator array are given by $$\dot{A}_j = (p_j - A_j^2)A_j + k[A_{j+1}\cos(\phi_{j+1} - \phi_j + \Phi)] + k[A_{j-1}\cos(\phi_{j-1} - \phi_j + \Phi)] \qquad \text{(Eq. 3)}$$

$$\dot{\phi}_j = \omega_j + k\left[\frac{A_{j+1}}{A_j}\sin(\phi_{j+1} - \phi_j + \Phi)\right] + k\left[\frac{A_{j-1}}{A_j}\sin(\phi_{j-1} - \phi_j + \Phi)\right]$$

where j=1, . . . , N, $A_j$ is the oscillator amplitude of the jth element (the boundary conditions for the end elements are $A_0=A_{N+1}=0$), $\Phi_j$ is the oscillator phase of the element, $p_j$ is the oscillator amplifier parameter, $\omega_j$ is the natural frequency of the jth oscillator element, k and Φ are the 2 coupling strength and coupling phase, respectively, and the overdots represent a time derivative. The boundary conditions capture the fact that, for the system under consideration, the two end elements of the 1-dimensional array have only a single nearest neighbor element. The $p_j$ and $\omega_j$ define the oscillator amplitude and frequency in the absence of coupling (k=0).

How such an array of coupled, nonlinear, oscillators can provide beam steering without 7 the use of phase shifters is now to be described. First, two simplifying assumptions are made: 1) 8 the amplitude dynamics of the array evolve on a much faster time-scale than the oscillator phases; and 2) in the steady state, the oscillators amplitudes will share a common value, i.e.

$$A_j \rightarrow A.$$

Under these assumptions, the oscillator dynamics are described by the evolution of phases alone.

$$\dot{\phi}_j = \omega_j + k\left[\begin{matrix} \sin(\phi_{j+1} - \phi_j + \Phi) \\ +\sin(\phi_{j-1} - \phi_j + \Phi) \end{matrix}\right] \qquad \text{(Eq. 4)}$$

where the boundary conditions become 100 $_0=\phi_1-\Phi$ and $\phi_{N-1}=\phi_N-\Phi$.

For beam steering, a spatially uniform phase gradient across the array must be established and controlled. Thus, the solutions of interest are of the form, $\Phi_j=(j=1)\theta+\omega t$. Substituting this into equation (4) above yields the following conditions on the oscillator natural frequencies ω:

$$\omega_j = \omega + (j-1)\dot{\theta} + k[\delta_{1,j}\sin(\theta+\Phi) - \delta_{N,j}\sin(\theta-\Phi)] \quad \text{(Eq. 5)}$$

where $$\delta_{1,j} \equiv \begin{Bmatrix} 1 & i=j \\ 0 & i\neq j \end{Bmatrix} \quad \text{(Eq. 6)}$$

and δ denotes the standard Dirac delta function and the oscillator natural frequencies $\omega_j$ are assumed to be accessible, adjustable parameters.

Equation (5) then describes how to manipulate those frequencies in order to establish a phase gradient, θ(t), across the array.

In the case of "static" beam steering, i.e. where the mainbeam is pointed in a fixed direction, the phase gradient will be constant in time and therefore $\dot{\theta}=0$. As a result, equation (5) implies that beam steering can be accomplished by simply adjusting the natural frequencies of the two end elements of the array alone. Of course, if $\dot{\theta}\neq 0$, every oscillator's natural frequency will require continuous adjustment in time.

We now show under what conditions these solutions are stable. To be a practical scheme, the oscillator array dynamics should rapidly converge to a desired state, even in the presence of small, external, perturbations from the environment.

To answer this question, perturbed solutions, $\phi_j=\phi_j^*+\eta_j$ where $\eta_j<<1$, are substituted into equation (4), leading to dynamical equations describing the time evolution of the perturbations:

$$\dot{\eta}_j=a\eta_{j+1}+b\eta_j+c\eta_j-1 \quad \text{(Eq. 7)}$$

where $$a=k\cos(\theta+\Phi)$$

$$c=k\cos(\theta-\Phi)$$

$$b=-(a+c) \quad \text{(Eq. 8)}$$

and $\eta_0=\eta_{N+1}=0$. Since terms of $O(\eta_j^2)$ or smaller have been neglected in obtaining equation (7), this is known as a linear stability analysis.

The eigenvalues of equation (7) will show whether such perturbations will grow (unstable solution) or decay (stable solution) exponentially fast in time. Through a series of coordinate transformations, the N−1 non-zero eigenvalues are obtained:

$$\rho_n = -2k\cos\Phi\cos\theta\left[1-\cos\left(\frac{\pi n}{N}\right)\right]* \sqrt{1-\tan^2\Phi\tan^2\theta} \quad \text{(Eq. 9)}$$

$$n = 1, \ldots, N-1$$

Equation (9) describes the stability of the spatially uniform phase gradient states for all possible parameter values. A particular solution will be stable provided the real parts of all the $\rho_n$ are negative. Inspection of equation (9) reveals that a solution will be stable if and only if k cos Φ cos θ>0. Assuming positive coupling, that is k cos ω>0, the range of stable spatially uniform phase gradients is limited to $$\frac{\pi}{2} > \theta > -\frac{\pi}{2} \quad \text{(Eq. 10)}$$

For an array with half-wavelength spacing, this corresponds to a maximum angle off broadside of ±30°. Use of frequency doublers will greatly enhance this scan range.

Figure 3:
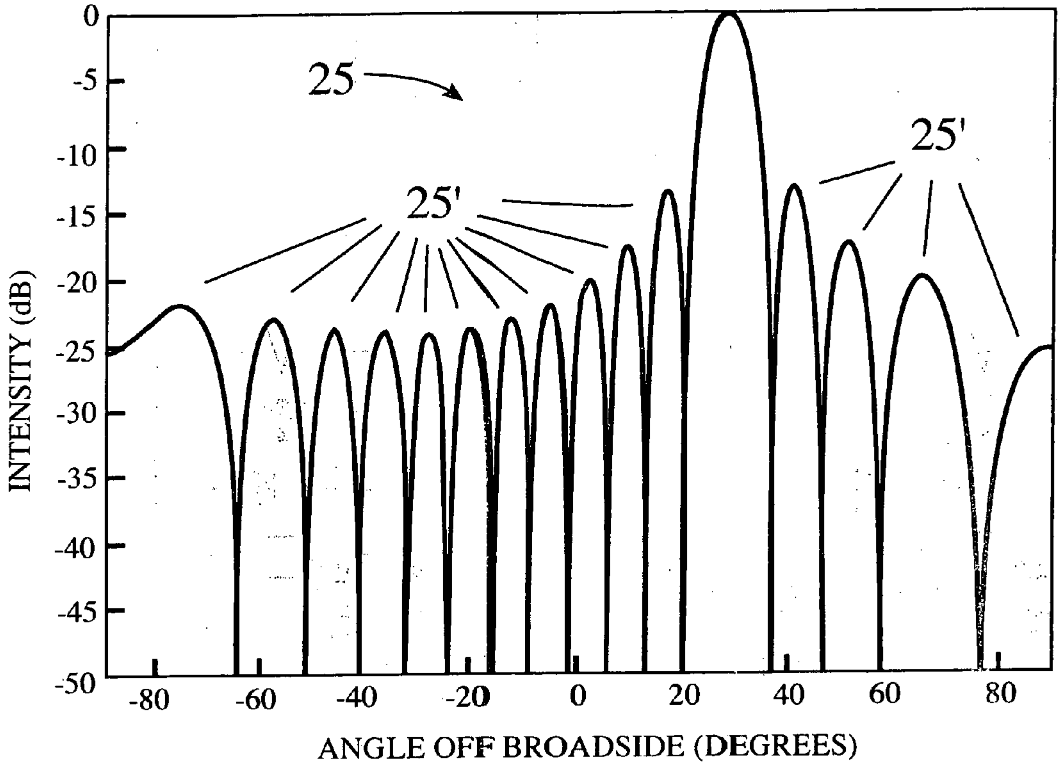
FIG. 3 illustrates the far-field radiation pattern of a sixteen element array.

FIG. 3 illustrates the success of this beam steering technique (in this case for a "static" composite beam 25 of a sixteen element array) by way of numerical integration of equation (4) for a given choice of oscillator natural frequencies defined by equation (5). Random initial conditions were used, and the intensity pattern for beam 25 was plotted after allowing transients to die out.

This beam steering approach has been extended to 2-dimensional, rectangular arrays, enabling independent steering in both azimuth and elevation. Analogous to the 1-dimensional array, static beam steering for a 2 dimensional array requires adjusting the natural frequencies of only the elements at the periphery of the array. The corresponding stability analysis separates into two, independent 1-dimensional problems each similar in form to equation (7).

As shown in FIG. 3, sidelobe levels 25' of beam pattern 25 are relatively high. This is expected, as the assumption of identical amplitudes leading to the reduced phase model essentially results in a radiation profile (pattern) of a uniformly illuminated array. The coupling strength k and coupling phase Φ were taken to be 1 and 0, respectively. The phase gradient established $\dot{\theta}(t)$ was chosen to be 0.475Π.

For certain applications, such sidelobe levels are unacceptable and must be significantly reduced. A solution is to apply weighting or tapering of the element amplitudes. Any of numerous weighting schemes may be used, each having benefits and drawbacks.

In accordance with the invention, a description as to how the oscillator amplitude dynamics can be used to apply a desired amplitude profile across the array while at the same time exploiting the phase dynamics for beam steering is presented. It is to be noted that the simplifying assumptions used in the pure beam steering description given above are not applied here. That is, 1) amplitude and phase dynamics are allowed to evolve on similar time-scales; and 2) oscillator amplitudes are allowed to settle to some specified, non-uniform state as dictated by a user's choice of system parameters.

Defining $z_j=A_j e^{i\Phi_j}$, the 2N real ordinary differential equations (3) can be expressed by a set of N complex, ordinary differential equations $$\dot{z}_j = (p_j + i\omega_j)z_j - |z_j|^2 z_j + ke^{i\Phi}[z_{j+1} + z_{j-1}] \quad \text{(Eq. 11)}$$

with the same boundary conditions on the two end elements, $A_0=A_{N+1}=0$. Although mathematically equivalent to equations (3), equation (11) provides a simpler, more direct way of understanding how to implement simultaneous sidelobe reduction and beam steering.

Solutions resulting in steered, low-side beam patterns are of the following complex number form:

$$z_j=a_j e^{i(\omega t+[j-1]\theta)} \quad \text{(Eq. 12)}$$

where the $a_j$ are the desired amplitude weightings that depend on the target sidelobe level and weighting scheme used. In this instance, ω is the reference frequency of the desired (beam) pattern. The taper coefficients ($a_j$) and phase gradient value (θ) are calculated from the chosen weighting scheme and element spacing.

The task is to determine how the accessible parameters, $[p_j,\omega_j]$, should be adjusted for equation (12) to be a solution of equation (11). Again, $p_j$ is the oscillator amplitude parameter and $\omega_j$ is the oscillator natural frequency.

Substituting equation (12) into equation (11) transforms the set of complex, ordinary differential equations into a set of complex, algebraic equations:

$$i(\omega+[j-1]\theta)=p_j+i\omega_j-a_j^2+k\begin{pmatrix}(1-\delta_{N,j})\left\{\dfrac{a_{j+1}}{a_j}\right\}e^{i(\theta+\Phi)}\\+(1-\delta_{1,j})\left\{\dfrac{a_{j-1}}{a_j}\right\}e^{-i(\theta-\Phi)}\end{pmatrix} \quad \text{(Eq. 13)}$$

The real and imaginary parts below define how the adjustments to $p_j$ (amplitude parameter of the jth oscillator) and $\omega_j$ (frequency of the jth oscillator), respectively, should be made.

$$p_j=a_j^2-k\begin{bmatrix}(1-\delta_{N,j})\left\{\dfrac{a_{j+1}}{a_j}\right\}\cos(\theta+\Phi)\\+(1-\delta_{1,j})\left\{\dfrac{a_{j-1}}{a_j}\right\}\cos(\theta-\Phi)\end{bmatrix} \quad \text{(Eq. 14)}$$

$$\omega_j=\omega+(j-1)\dot{\theta}-k\begin{bmatrix}(1-\delta_{N,j})\left\{\dfrac{a_{j+1}}{a_j}\right\}\sin(\theta+\Phi)\\-(1-\delta_{1,j})\left\{\dfrac{a_{j-1}}{a_j}\right\}\sin(\theta-\Phi)\end{bmatrix} \quad \text{(Eq. 15)}$$

Note that in the limit of identical amplitudes, these conditions equal those from the reduced phase model above (as they must). Immediately obvious from equations (14–15) is that sidelobe reduction requires manipulating all of the array elements, unlike the simple beam steering of a uniformly illuminated array.

Setting up the linear stability analysis is readily handled through use of the amplitude and phase differential equations (3). Substituting in the perturbed amplitudes and phases $$A_j=a_j+\xi_j$$

$$\phi_j=\phi_j^*+\eta_j \quad \text{(Eq. 16)}$$

where $\xi_j$, $\eta_j$<<1 and where ξ and η are perturbation variables representing the new time evolving perturbations to the desired solutions $a_j$ and $\phi^*_j$. It is straightforward to derive the differential equations governing the time evolution of the $\xi_j$ and $\eta_j$. However, due to the complexity of the resulting stability matrix, it seems unlikely that closed-form analytic expressions for the eigenvalues (i.e. for an arbitrary weighting scheme and sidelobe level) can be obtained as they were for the reduced phase model above. Even so, it is simple enough to numerically compute those eigenvalues for any given set of parameter values.

To better understand how the above results are used for beam shaping, the following example is given. Suppose the mainbeam of a nine-element array with half-wavelength spacing is to be steered −20° off broadside. Moreover, a Villeneuve $\bar{n}$ scheme is chosen to reduce the sidelobe level to −40 dB with respect to the mainbeam intensity. Of course, one skilled in the art will realize that other weighting schemes, such as cosine-on-a-pedestal, Dolph-Chebychev and Taylor, for example, may also be used.

First, the amplitude weight ($a_j$) distribution is computed. The computed weights used in this example for −40 dB sidelobes are tabulated below.

TABLE 1

| Element Number | Amplitude Weight ($a_j$) |
|---|---|
| 1 | 0.1239 |
| 2 | 0.3451 |
| 3 | 0.6387 |
| 4 | 0.8981 |
| 5 | 1.0000 |
| 6 | 0.8981 |
| 7 | 0.6387 |
| 8 | 0.3451 |
| 9 | 0.1239 |

Next, the phase gradient required for the desired mainbeam direction is calculated using $$\theta=2\pi\frac{d}{\lambda}\sin\Psi$$

where, for half-wavelength spacing (d), $$d=\frac{\lambda}{2}.$$

To steer the mainbeam Ω=−20° off broadside, θ=−1.0745 or −61.6°. For simplicity time has been rescaled such that the coupling strength has been normalized to unity, k=1; in addition, the coupling phase and reference frequency are both taken to be zero, i.e. Φ=0 and ω=0. Substituting the amplitude weightings $\alpha_j$ and phase gradient θ into equations (14–15) yields the necessary parameter values:

TABLE 2

| | Parameter values | |
|---|---|---|
| Element Number | Oscillator Amplitude parameter, $p_j$ | Oscillator Natural frequency parameter, $\omega_j$ |
| 1 | −1.3108 | −1.4490 |
| 2 | −0.9330 | −0.3115 |
| 3 | −0.5191 | 0.2386 |
| 4 | −0.0621 | 0.6462 |
| 5 | 0.1446 | 1.0000 |
| 6 | −0.0621 | 1.3538 |
| 7 | −0.5191 | 1.7614 |
| 8 | −0.9330 | 2.3115 |
| 9 | −1.3108 | 3.4490 |

Figure 4:
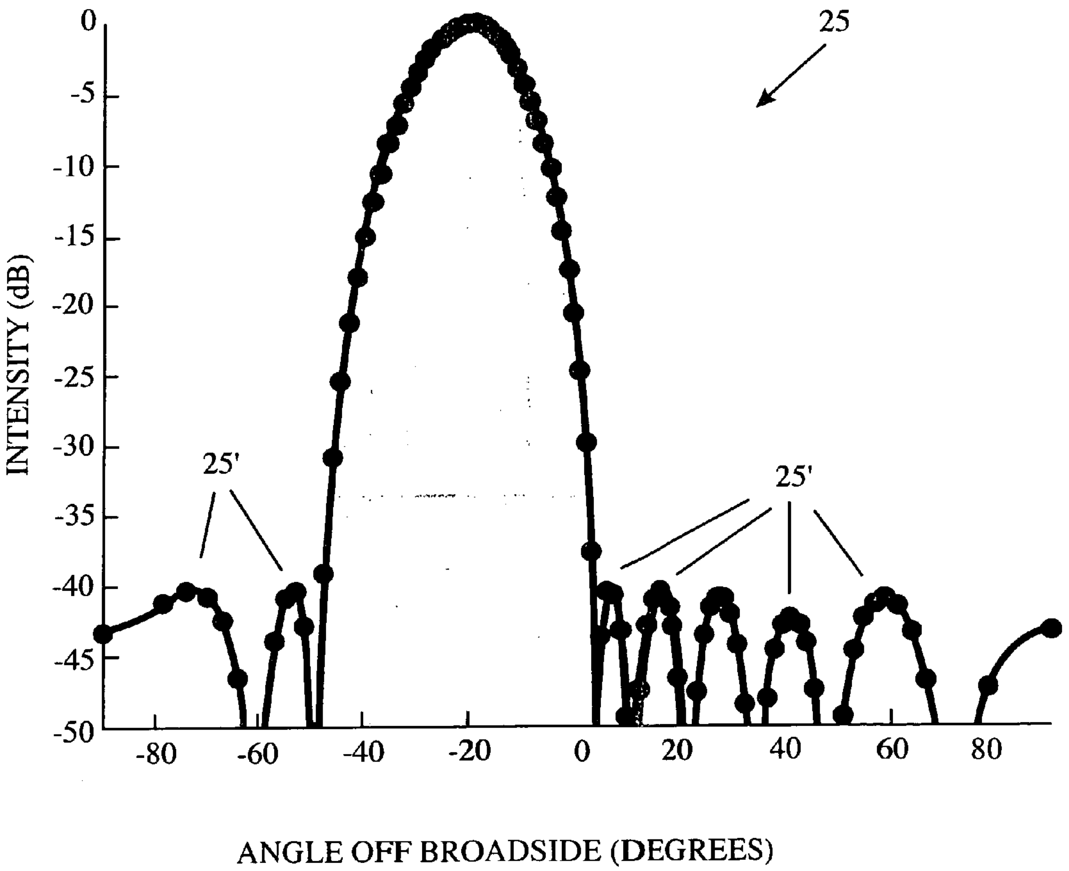
FIG. 4 depicts a far-filed radiation pattern of a nine element array wherein side-lobe shaping is shown.

At this point, a linear stability analysis is conducted numerically. As the real parts of the 2N−1 non-zero eigenvalues of the stability matrix are all negative, the desired state is stable and therefore considered realizable. Finally, equation (11) is integrated (from random initial conditions) using these parameter values. After allowing the transients to die out, the steady-state far-field radiation (beam) pattern from the nine element array is plotted. FIG. 4 is a far-field radiation pattern of this plot. The solid line denotes the desired profile, while the dots represent the intensity pattern arising from the coupled oscillator dynamics.

A description as to how an acoustic receiving application of the invention may be implemented is now to be described.

One skilled in the art will realize that this example is not meant to imply a narrow field of application and that the description given will scale to arbitrary frequencies. It is only necessary that the implementation reduce to a dynamical description wherein signal transduction, transmission and signal processing are performed simultaneously and in parallel. Additionally, this description is not intended to suggest only a receiving application. The invention is equally applicable to a transmitting system.

The main principles are the following: 1) a dynamical based description of the constituent oscillator element(s); 2) a description of how the phase and amplitude equations for the constituent oscillator element(s) correspond to equation (3) above; and 3) parallel and simultaneous signal transduction and processing.

In an acoustic receiving application, a monolithic semiconductor device provides a low cost and flexible implementation of the invention. For example, a CMOS "analog microprocessor" may be used, as typical modern CMOS processes can support designs that operate over a frequency range that spans from sub-hertz to gigahertz. In addition, a variety of sensor and transducer devices can be fabricated using these processes, including MEMS gyroscopes, acoustic sensors and optical sensors.

The design of the example nonlinear aperture antenna will turn upon the frequency range(s) of operation, the core oscillator(s) chosen and the CMOS fabrication process suitable for such oscillator(s). The oscillator(s) must possess a "limit cycle" oscillation and a nonlinear quality, both in the absence of external influence.

With these requirements, the oscillator must be at least second-order (i.e. posses no less than two independent variables or degrees of freedom) and be reducible in description to an amplitude and phase mathematical model, such as for example equation (3) above. Ideally, this oscillator will closely match the theoretical beam-forming model described herein, for example, by having been derived from a set of device level circuit equations.

The chosen coupling method used between the oscillators will depend upon the desired signal processing and parallelizing application. One or two-dimensional arrays of the oscillators can be used with any of a wide range of coupling topologies known to those in the art: nearest neighbor, next-nearest neighbor, global, random and small world networks. Providing that the mathematical description of the implemented system fits within the theoretical beam-forming model described above in equation (3), a large variety of coupling topologies are is possible. The wider the number of variable system parameters available, including coupling strengths between independent variables, the larger the "solution space" will be for achieving a particular beam pattern. Significant design gains may be obtained by relinquishing accessible parameters in order to counteract undesirable effects such as parasitic coupling between elements.

Finally, the energy receiving/transmitting transducer element used in conjunction with the oscillator will be chosen depending on the particular needs of the application and the flexibility of the design.

Acoustic frequencies are well within the operational capabilities of a typical CMOS circuit. In this frequency range, parasitic effects such as capacitive and inductive coupling become negligible. Thus it is possible to locate the transducer elements external to the chip. According to the transducers used, the raw current and voltage signals from the transducers are incorporated directly into the mathematical description of the array system, i.e. through the device level transducer equations. In this sense, the core concept of the nonlinear dynamical (aperture) system of the invention is preserved, despite the fact that the actual transducers are external to the core computational device. With the transducer handled externally, the next task is to identify a suitable oscillator design.

In this case, due to the number of possible oscillator designs, this explanation will assume an example oscillator design that includes two oscillator state variables represented by voltages $V_1$ and $V_2$. The summing of terms in equation (17), below, is represented by a Kirchhoff current junction. In equation (17), F represents the part of the system responsible for self-sustained oscillation in the absence of any external or coupling inputs, K represents coupling terms, S represents the input signal from the transducer.

$$\dot{X}=F_j(X_j)+K_j(X_{j-1}, X_j, X_{j+1})+S_j(t) \quad \text{(Eq. 17)}$$

$$x_j=\{V_{1j}, V_{2j}\} \quad \text{(Eq. 18)}$$

Figure 5:
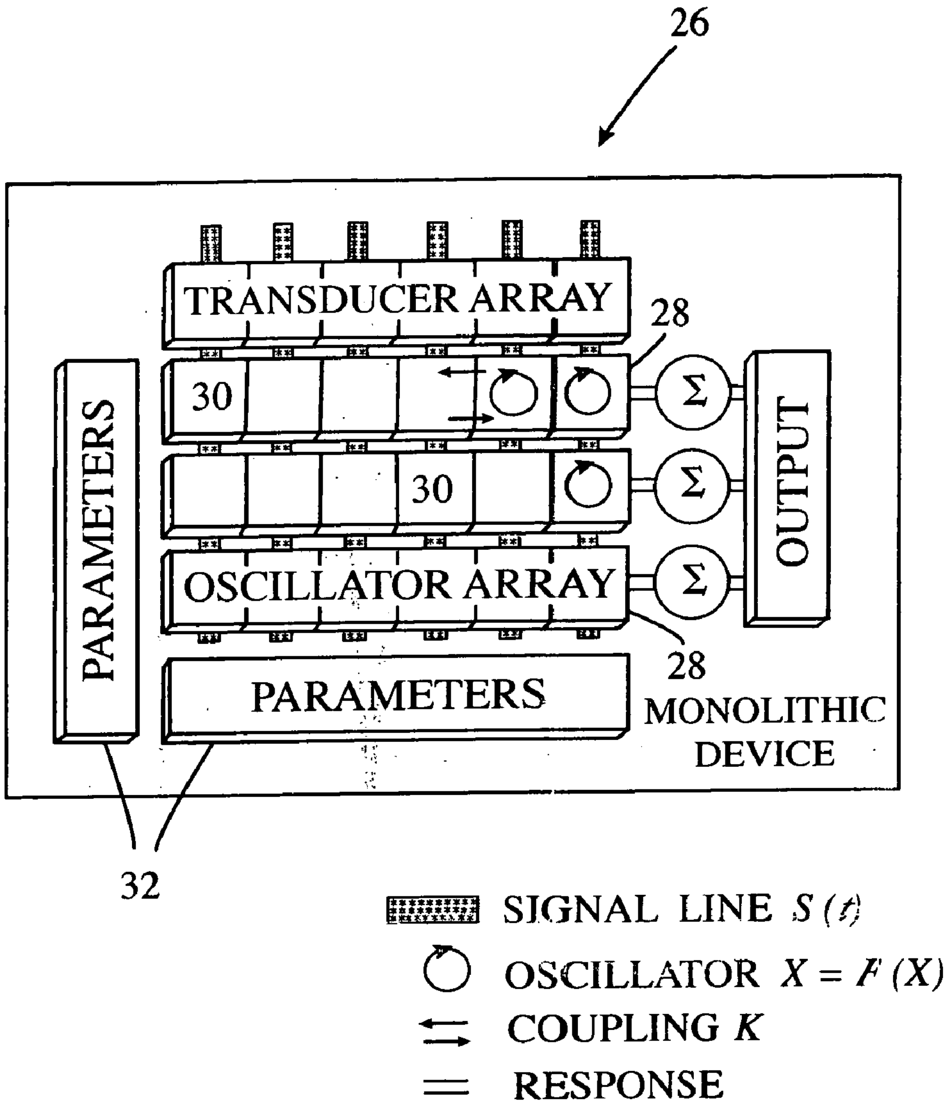
FIG. 5 is a block diagram of an example analog acoustic array.

In FIG. 5, a hypothetical example array processor 26 includes rows 28 of oscillators 30. Each row of oscillators uses, for example, local linear nearest neighbor coupling and demonstrates self-sustaining oscillation around a natural frequency. Adjustable parameters 32 include oscillator frequency, oscillator amplitude and coupling parameters (coupling strength and coupling phase) are adjustable from the periphery of the array. Through these adjustable parameters each array can be made to generate/act as an individual transmitting/receiving beam having unique phase orientation and amplitude tapering. By processing transducer inputs in parallel with multiple arrays, the device forms a parallel beam-forming array.

With the addition of simple external circuitry, array processor 26 can be used to locate a coherent signal bearing, or illuminate when a particular correlated spectrum is present.

Figure 6:
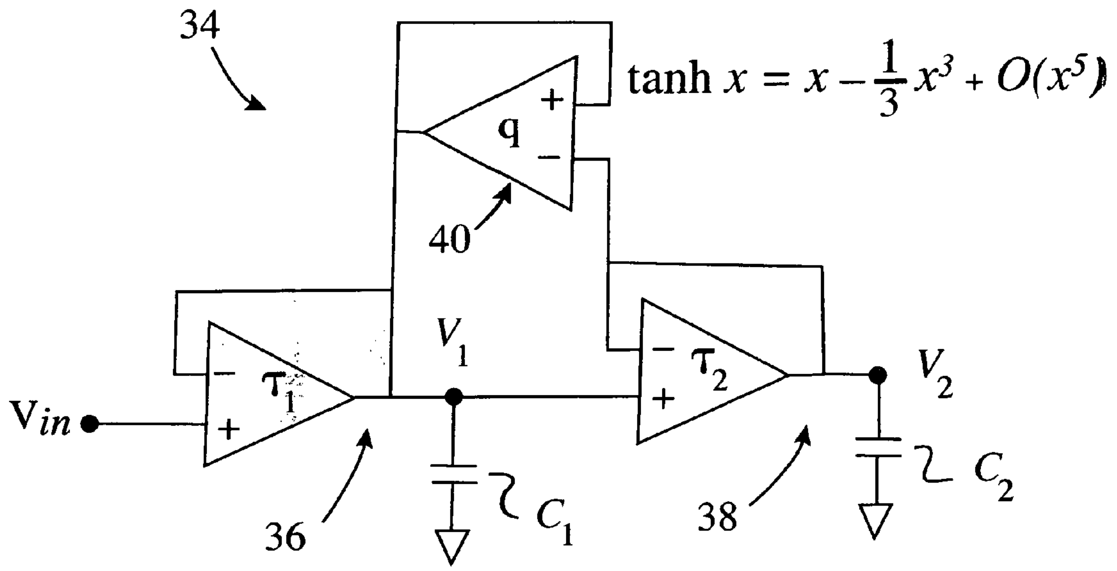
FIG. 6 is an example oscillator as may be used in the invention.

An example CMOS beam-forming constituent oscillator element as may be used for oscillator 30 of array 26 is an operational amplifier based oscillator 34 illustrated in FIG. 6. This individual oscillator consists of two feed-forward amplifiers, labeled $\tau_1$ and $\tau_2$, and two capacitors C1 and C2. The amplifier-capacitor circuit pairs 36 and 38 are constructed in an integrator-follower configuration, representing a second order system. Oscillator 34 also includes a single nonlinear feedback amplifier 40. Amplifier 40 is nonlinear in the sense that its region of linear transconductance is narrow with respect to the feed-forward amplifiers.

Figure 7:
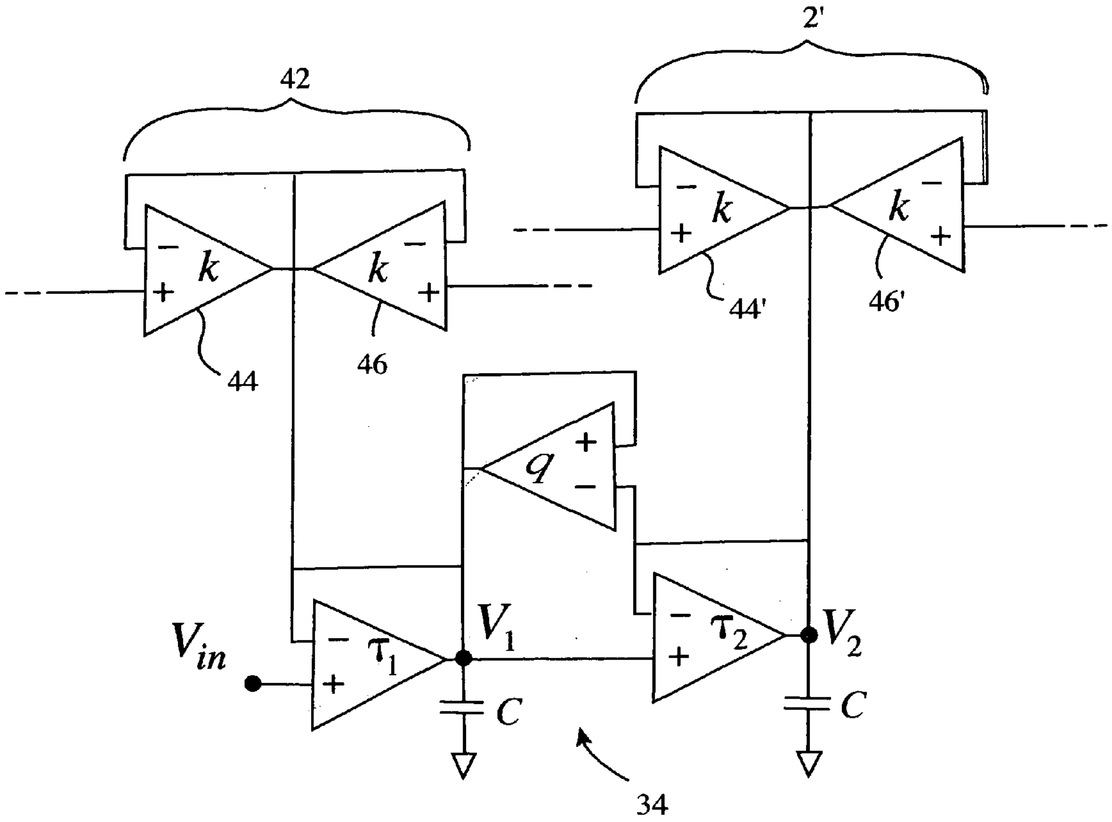
FIG. 7 shows the oscillator of FIG. 6 with example coupling.

The circuit equations of the oscillator can be shown to reduce to the familiar van der Pol equation, equation (19). In equations (20–22), the frequency ($\omega$), nonlinearity ($\mu$), and amplitude ($\eta$) parameters are all functions of the accessible circuit parameters. As is illustrated in FIG. 7, local nearest neighbor coupling 42 and 42' is achieved with example oscillator 34 with additional linear amplifiers (44 and 46) and (44' and 46'). In this example, due to a limitation on the number of available pins, is only one global input signal. As a result, the CMOS example shown is limited to transmit operation only.

In FIG. 7, each coupling term $K_j$ is achieved via an ordinary transconductance amplifier. For a single amplifier the input-output relationship is described by $I_n=I_b$ tan h(($V_+-V_-$)/2 $U_t$), where $I_n$ is the amplifier output current, $I_b$ is an adjustable bias current, $V_+$ and $V_-$ are the voltage inputs to the positive and negative terminals respectively, and $U_t$ is a fixed parameter dependent on temperature.

In an ideal sense, an amplifier has in infinite input impedance and zero output impedance. Because of this, one amplifier signifies unidirectional coupling between two variables. Therefore, four amplifiers (44, 44', 46, 46') are required for bi-directional coupling for both state variables, $V_1$ and $V_2$, between adjacent oscillators. Consider amplifier 44, the input line coming from the left connects to the voltage $V_1$ of the left adjacent oscillator (not shown), i.e. $V_{1,j-1}$. The amplifier computes a coupling current that is the difference between $V_{1,j-1}$ and $V_{1,j}$. For small differences in voltages, the transconductance equation reduces to a linear form: $I_n = I_b(V_{1,j-1} - V_{1,j})/2\,U_t$. The current output is fed back into the oscillator labeled j through an appropriate Kirchoff current junction. After considering all four coupling amplifiers, along with a simple substitution and variable change, the van der Pol equation is modified with the addition of the coupling terms, as shown in equation (23).

A suitable set of phase and amplitude equations can be derived and are given in equations (24–25).

From within a mathematical framework, the same process for prescribing beam patterns described above can be applied to this system. As is described in reference to FIG. 5, input and output, along with circuitry for setting the accessible system parameters, are located along the periphery of the array.

$$\ddot{x} = 2\mu(1-\eta x^2)\dot{x} - \omega^2 x \qquad \text{(Eq. 19)}$$

$$\mu = \mu(p_1, \ldots, P_N) \qquad \text{(Eq. 20)}$$

$$\eta = \eta(p_1, \ldots, P_N) \qquad \text{(Eq. 21)}$$

$$\omega = \omega(p_1, \ldots, P_N) \qquad \text{(Eq. 22)}$$

$$\ddot{x}_i = -2\mu(\eta x_j^2 - 1) - \omega^2 x_j + k_{j1}(\omega_{j+1}\omega_j x_{j+1} + \omega_{j-1}\omega_j x_{j-1} - 2\omega_j^2 x_j) + k_{j2}(\omega_j \dot{x}_{j-1} - 2\omega_j \dot{x}_j) \qquad \text{(Eq. 23)}$$

$$\dot{\phi}_j = \omega_j + \sqrt{2}\,|\kappa| \begin{bmatrix} \frac{A_{j+1}}{A_j}\sin(\phi_{j+1} - \phi_j + \varphi) \\ \frac{A_{j-1}}{A_j} + \sin(\phi_{j-1} - \phi_j + \varphi) \end{bmatrix} \qquad \text{(Eq. 24)}$$

$$\dot{A}_j = \mu(1 - A_j^2)A_j + |\kappa| \begin{bmatrix} A_{j+1}\cos(\phi_{j+1} - \phi_j + \Phi) + A_{j-1}\cos(\phi_{j-1} - \phi_j + \Phi) \\ -2A_j\cos\Phi \end{bmatrix} \qquad \text{(Eq. 25)}$$

$$w_j \equiv 2\left(\frac{\Delta\omega_j}{\omega} - |\kappa|\sin\Phi\right)$$

$\omega_j = \omega + \Delta\omega_j$, $\omega$ is an arbitrary reference frequency $$|\kappa| = \sqrt{\Lambda_x^{w} + \kappa_{\dot{x}}^2}$$

$$\Phi = \tan^{-1}\left(\frac{-\kappa_x}{\kappa_{\dot{x}}}\right)$$

Figure 8:
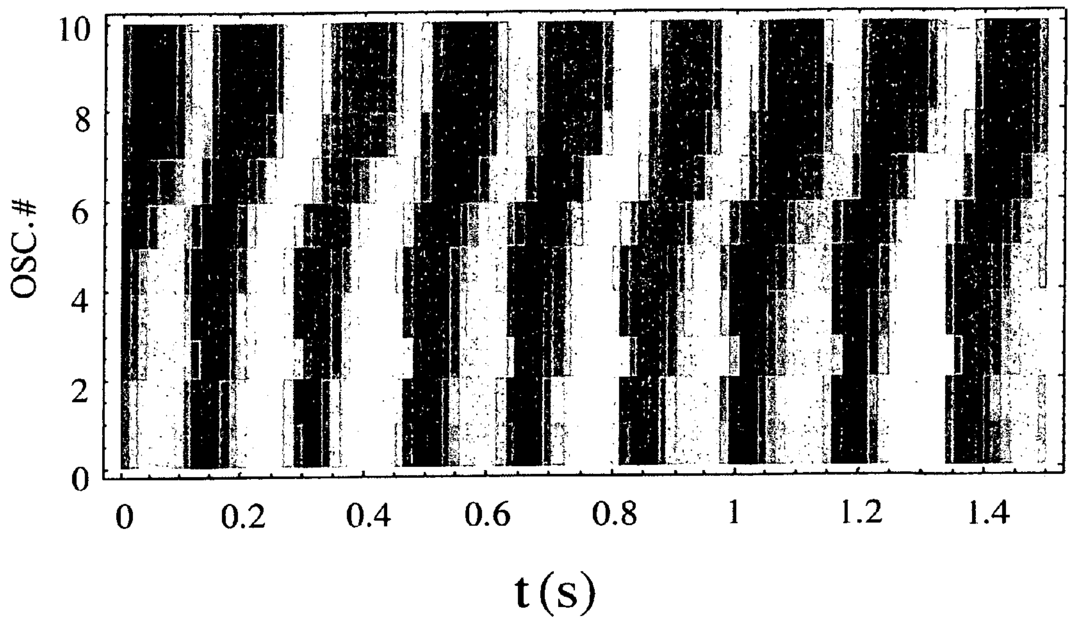
FIG. 8 illustrates beam forming and steering in accordance with the invention.

The example CMOS array discussed has been shown to act as a functional beam former, see FIG. 8. This figure shows a space-time plot for a single row of oscillators, illustrating beam forming and steering. In the figure, the vertical axis is oscillator number and the horizontal axis is time. The grayscale, from dark to light, indicates the amplitude of one of the independent variables per oscillator as a function of time. In the figure, it is clear that each element in the array oscillates with the same frequency (i.e. they are stable and frequency locked) with a constant phase difference (time delay) between adjacent oscillators. This is achieved by simply detuning the natural frequencies of the end elements of the array as described herein.

Because of prototype system non-idealities, or mismatch within the array, the beam pattern appears to be non-uniform. Nevertheless, in this example system, the above prescription for the invention is demonstrated. Furthermore, given the close relationship between the theory presented and the hardware realization, it should be clear that further demonstrations of beam shaping, beam steering and both sending and receiving applications can be demonstrated without deviating from the framework of this example oscillator.

Figure 9:
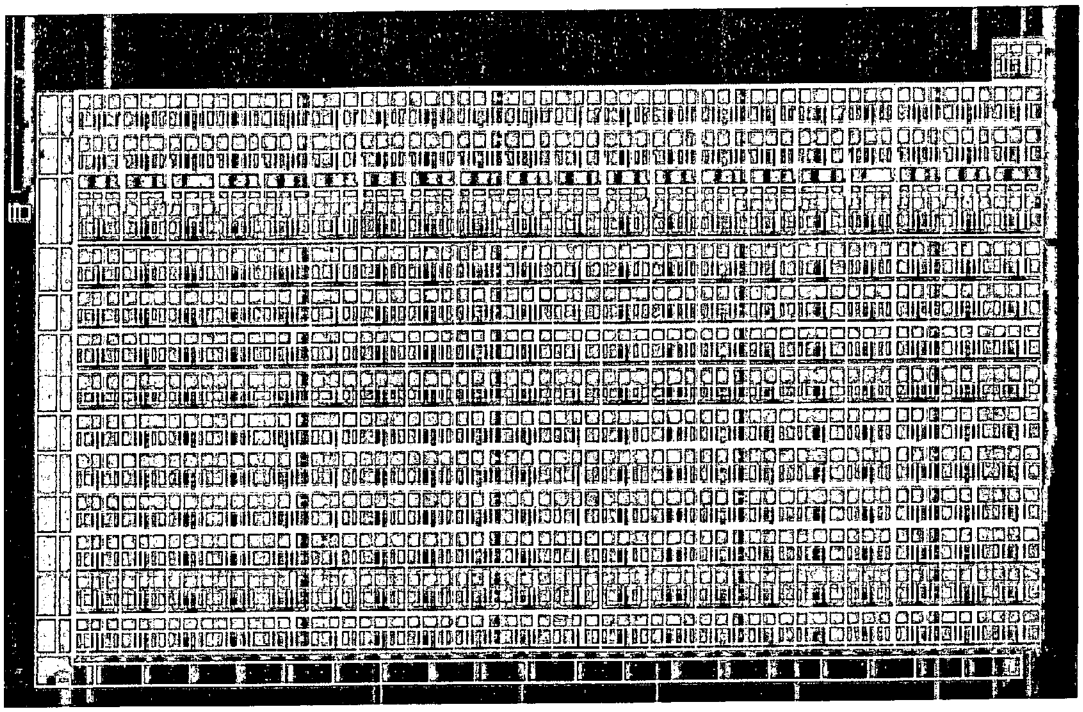
FIG. 9 is a micrograph example of an acoustic array mask layout in accordance with the invention.

FIG. 9 is a mask layout of the example device fabricated using the TSMC 0.35 process. The actual array occupies less than 4 $mm^2$ and is packaged as a ceramic microchip. Physically, the chip consists of a number of stacked one-dimensional oscillator arrays, similar to the array depicted in FIG. 5.

Obviously, many modifications and variations of the invention are possible in light of the above description. It is therefore to be understood that within the scope of the appended claims, the invention may be practiced otherwise than as has been specifically described.

What is claimed is:

1. A transducer array apparatus comprising:

a plurality of array elements, each of said array elements including a transducer-oscillator pair wherein a transducer is operably coupled to a nonlinear oscillator, said transducer-oscillator pairs contributing to generating a beam pattern for receiving or radiating a signal;

coupling means for interactively connecting said transducer-oscillator pairs, wherein said coupling means is characterized by a coupling strength factor, a coupling phase, and by a coupling topology;

wherein each said nonlinear oscillator is characterized by an oscillator frequency and by an oscillator amplitude, means for adjusting said oscillator frequencies so that said beam pattern is steerable in direction; and means for adjusting said oscillator amplitudes so that said beam pattern is adjustable in amplitude.

2. The transducer array apparatus of claim 1 wherein said transducer-oscillator pairs are disposed as a side-by-side, one-dimensional row of array elements.

3. The transducer array apparatus of claim 1 wherein said non-linear oscillator includes a resistor-inductor-capacitor network operably coupled to a nonlinear conductance element.

4. The transducer array apparatus of claim 1 wherein said coupling topology is one of the group of nearest-neighbor, next-nearest neighbor, global, random and small world networks.

5. The transducer array apparatus of claim 1 wherein said means for adjusting said oscillator amplitudes includes determining weights for application to said oscillator amplitudes, said weights determined through one of the following weighting processes: Villeneuve, cosine-on-a-pedestal, Dolph-Chebychev and Taylor.

6. The transducer array apparatus of claim 1 wherein said nonlinear oscillator exhibits limit cycle oscillation behavior.

7. A transducer array method comprising:

providing a plurality of array elements, each of said array elements including a transducer-oscillator pair wherein a transducer is operably coupled to a nonlinear oscillator, said transducer-oscillator pairs contributing to generating a beam pattern for receiving or radiating a signal;

interactively connecting said transducer-oscillator pairs, wherein said connecting is characterized by a coupling strength factor, a coupling phase, and by a coupling topology;

wherein each said nonlinear oscillator is characterized by an oscillator frequency and by an oscillator amplitude, adjusting said oscillator frequencies so that said beam pattern is steerable in direction; and adjusting said oscillator amplitudes so that said beam pattern is adjustable in amplitude.

8. The method of claim 7 wherein said step of connecting includes selecting said coupling topology from the group of nearest-neighbor, next-nearest neighbor, global, random and small world networks.

9. The method of claim 7 wherein said step of adjusting said oscillator amplitudes includes applying a weighting process to said amplitudes.

10. The method of claim above 9 wherein said weighting process is one of the following weighting processes: Villeneuve, cosine-on-a-pedestal, Dolph-Chebychev and Taylor.

* * * * *